UNITED STATES PATENT OFFICE.

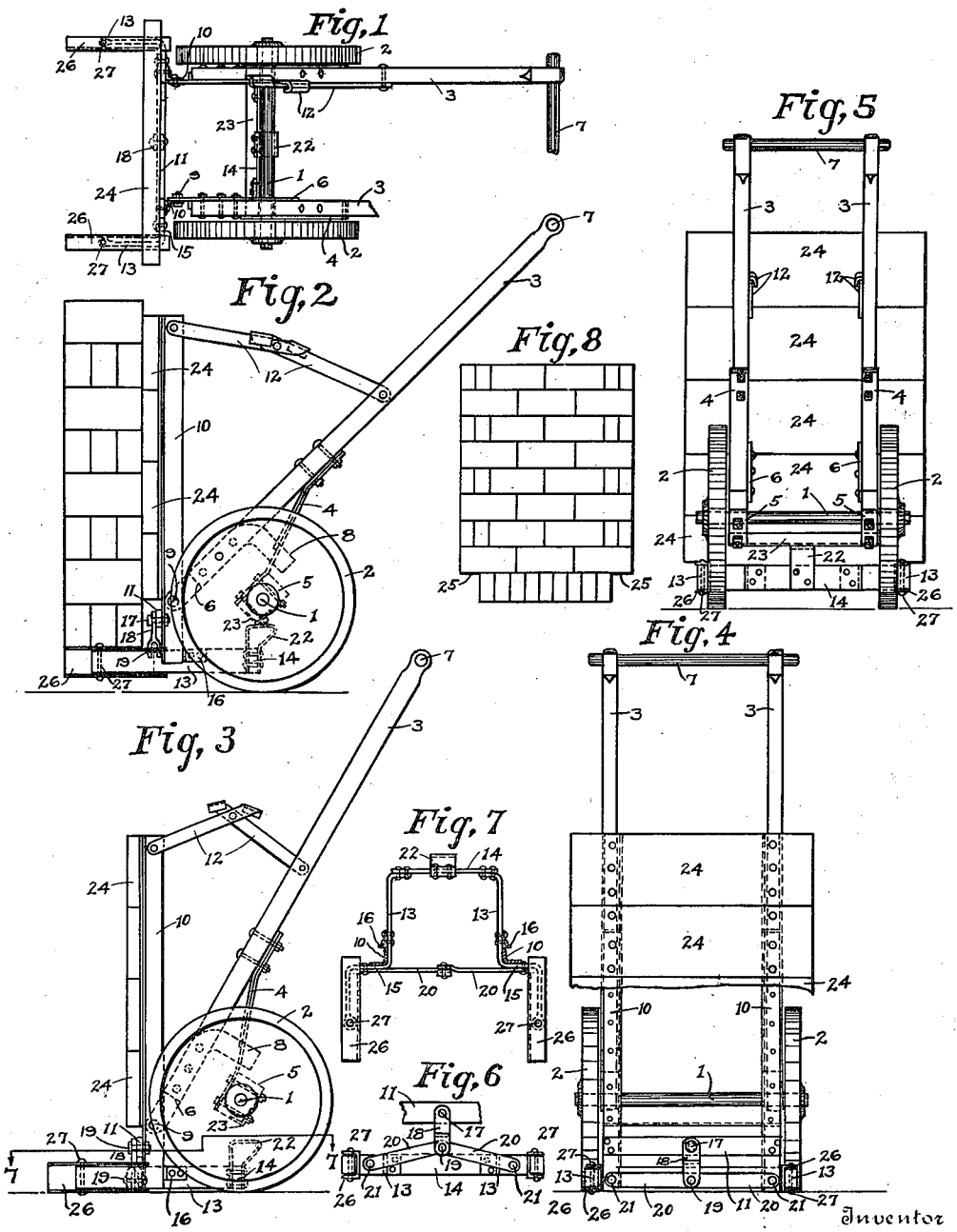

ROBERT A. FONTAINE, OF ROANOKE, VIRGINIA.

BRICK-HANDLING TRUCK.

1,299,447.　　　　Specification of Letters Patent.　　Patented Apr. 8, 1919.

Application filed April 26, 1918.　Serial No. 230,885.

*To all whom it may concern:*

Be it known that I, ROBERT A. FONTAINE, a citizen of the United States, residing at Roanoke, in the county of Roanoke and State of Virginia, have invented certain new and useful Improvements in Brick - Handling Trucks, of which the following is a specification.

This invention pertains to an apparatus for handling bricks or the like in bulk and has for its object to provide a hand truck whereby a hack of bricks may be picked up in a unit and transported and again deposited without disturbing the hack and without handling the individual bricks. With such general object in view the invention consists of the formation, combination, and arrangement of parts as will be herein described and claimed.

In the accompanying drawings which show a preferred embodiment of the invention and which form a part of this specification, Figure 1 is a broken plan view of the truck of the present invention; Fig. 2 is a side elevation view thereof, showing a load of bricks lifted and ready to be transported; Fig. 3 is a similar view showing the truck ready to engage a hack of bricks; Fig. 4 is a front elevational view with parts broken away, for clearness; Fig. 5 is a rear elevational view; Fig. 6 is a fragmentary front elevational view showing portions of the clamp-actuating mechanism; Fig. 7 is a horizontal section taken approximately on the line 7—7 of Fig. 3; and Fig. 8 is a front elevational view showing the manner of hacking up the bricks to be handled.

Referring now to these drawings it will be seen that the truck embodies a frame work which is carried on a single axle 1 supported upon wheels 2. The frame work includes the side bars or handles 3, leaf springs 4 being attached to the under faces thereof and these resting upon and being secured to axle bearings 5. To the lower ends of the side bars are attached metal arms 6 which serve at their lower extremities as pivot points for the brick-carrying frame. These arms 6 have upper turned ends 8 which serve as lateral guides for the side bars. Connecting the upper ends of the side bars 3 is a cross bar 7 which may be located to form a convenient handle.

The brick frame, which is pivotally connected at 9 to the side bars consists of a pair of upright angles 10 with a cross bar 11 rigidly tying the same together. Near their upper ends the angles 10 are allowed a limited swiveling motion with respect to the side bars 3 through the action of the swiveling links 12 which extend between these members.

At the bottom of the brick frame is a horizontally disposed clamp which is constructed with a pair of offset side limbs 13 joined at their rear ends by a spring plate 14, this latter being formed so as to tend to throw the outer ends of the limbs 13 apart from their normal restrained positions. To the outer face of each of these side limbs 13 and spaced a suitable distance from the transversely directed portions 15 thereof are guide clips 16 for the lower ends of the angles 10 which in operation move vertically in the ways thus formed. And pivotally connected at 17 to the cross bar 11 is a link 18, to the lower end of which at 19 are operatively connected the inner ends of the oppositely and outwardly extending toggle links 20. The outer ends of these links 20 are attached to the side limbs 13 at 21 so that when the angles 10 and cross bar 11 move upward relatively to the side limbs 13 the latter will be drawn toward each other, deflecting the spring 14. Clamp blocks such as the channels 26 are pivotally attached to the outer ends of the side limbs 13 at 27 in such manner that they may adapt themselves to an irregular or tapered body if the same is to be handled. These channels have their backs turned inwardly and at their inner ends the webs are cut away so that the upper and lower flanges straddle the portions 15 of the side limbs to guide the said clamping blocks.

Extending vertically from the spring 14 is a member 22 which is adapted to contact a suitably arranged stop such as the angle 23 on the axle boxes 5 or other means fixed with respect to the axle.

Extending across the front faces of the angles and affixed thereto are back boards 24 against which the bricks rest when being transported.

In the use of the device the bricks are set up on the ground in hacks such as shown in Fig. 8, with the bottom row of slightly less width than those above it, forming shoulders 25 under which the clamps may be entered, these clamps being also arranged to clamp inwardly against the end faces of the bottom row of bricks. With the bricks so stacked the truck is wheeled up to the hack and the clamps entered in the spaces provided for them. Fig. 3 shows the positions of the parts of the truck when it is ready to be wheeled up to engage the hack, and it will be seen that in this position the side bars or handles 3 are somewhat elevated. Also the clamps and attached parts are down to their lowermost positions, the angles 10 likewise being in their lowest position. At the same time the toggle links 20 lie in substantial alinement, thus allowing the clamps, through the action of the spring 14, to be drawn apart.

The truck having now been brought into engagement with the bricks the handles 3 are swung downward, this raising the angles 10 and the clamps until the rear end of the clamps, or in this embodiment, the member 22, strikes a fixed part such as the angle 23, and until the upper surfaces of the clamping blocks 26 contact the brick faces 25. Upward movement of the clamp is thus arrested and further lowering of the handles will give a relative upward movement between the angles 10 and the clamps, this further movement resulting in drawing the clamp blocks firmly against the ends of the bottom row of bricks through the toggle action of the links 20. The load may now be raised off the ground by still further lowering of the handles and the bricks may be transported as desired, the parts being in the position shown in Fig. 2. It will be apparent that the bricks may likewise be deposited by a reversal of operation.

Thus has been produced a brick handling device that is economical of time and labor, that handles the bricks in a manner to avoid breakage, and that is especially adapted for rehandling the same hacks. No detachable or spare bodies or other accessories are required. It should also be noted that both frontwardly and laterally, no part of the apparatus extends out beyond the line of the hack, thus allowing the bricks to be deposited in a continuous row or in corners, such as when loading into a box car.

Various embodiments of the invention which have thus been described are contemplated within the scope of the claims without departing from the spirit thereof.

What is claimed is:

1. A brick-handling truck having a wheel-supported axle, a frame rotatably mounted upon the axle, a portion of said frame being adapted to accommodate a hack of bricks, and means actuated upon the rotation of the frame about the axle for retaining the bricks upon the frame, said means including inwardly-acting clamping means adapted to engage a portion of the hack of bricks, said clamping means being formed to react vertically against a portion of the truck and against a portion of the hack of bricks to actuate the same.

2. A brick-handling truck having a wheel-supported axle, a handle mounted upon the axle and rotatable thereabout, a frame pivotally supported upon the handle, and inwardly movable clamping members attached to the frame, the clamping members and the frame being arranged to be moved vertically for a limited distance with respect to the axle and the frame being arranged to be moved an additional amount vertically with respect to the axle and the clamps, said additional movement being arranged to actuate the said clamps, all of said movements being effected through the rotation of the handle about the axle.

In testimony whereof I affix my signature.

ROBERT A. FONTAINE.